United States Patent [19]

Kawamura et al.

[11] Patent Number: 4,834,223

[45] Date of Patent: May 30, 1989

[54] VALVE STRUCTURE FOR TELESCOPIC HYDRAULIC DAMPER

[76] Inventors: Sadao Kawamura, Yamate-cho Park Mansion 301, 5-25, Yamate-cho, Hammatsu-shi, Shizuoka; Kanau Iwashita, c/o Honda R & D Co., Ltd., 4-1, Chuo, 1-chome, Wako-shi, Saitama; Tomeo Fuse, 567-1 Asana, Asaba-cho, Iwata-gun, Shizuoka; Shuichi Kawahara, 4306-1, Nishi-ohbuchi, Ohsuka-cho, Osaga-gun, Shizuoka; Naoyuki Sataka, 14-5, Toshin-cho, Iwata-shi, Shizuoka; Hidekuni Ito, 1371-12, Asaba, Asaba-cho, Iwata-gun, Shizuoka, all of Japan

[21] Appl. No.: 62,872

[22] Filed: Jun. 16, 1987

[30] Foreign Application Priority Data

| Oct. 29, 1986 [JP] | Japan | 61-166033[U] |
| Nov. 13, 1986 [JP] | Japan | 61-175189[U] |
| Nov. 19, 1986 [JP] | Japan | 61-177869[U] |
| Apr. 7, 1987 [JP] | Japan | 62-52385[U] |
| Apr. 7, 1987 [JP] | Japan | 62-52386[U] |

[51] Int. Cl.$^4$ ............. F16F 9/19; F16F 9/342
[52] U.S. Cl. .............. 188/282; 137/543.15; 188/287; 188/289; 188/322.15; 244/104 FP; 280/276; 280/703
[58] Field of Search .......... 188/282, 289, 287, 286, 188/322.13, 322.14, 322.15, 313, 316, 317; 137/543.15; 280/703, 276; 244/104 FP

[56] References Cited

U.S. PATENT DOCUMENTS

| 1,405,968 | 2/1922 | Christman | 137/543.15 |
| 1,608,424 | 11/1926 | Pertman | 137/543.15 |
| 3,268,037 | 8/1966 | Louis | 137/543.15 |
| 3,395,725 | 8/1968 | Roach | 188/322.15 X |
| 3,912,054 | 10/1985 | Fabre et al. | 188/317 X |
| 4,059,175 | 11/1977 | Dressell, Jr. et al. | 188/322.15 X |
| 4,278,266 | 7/1981 | Inoue et al. | |
| 4,392,664 | 7/1983 | Tsuchiya et al. | |

FOREIGN PATENT DOCUMENTS

| 930716 | 7/1955 | Fed. Rep. of Germany | 188/322.13 |
| 1500169 | 5/1969 | Fed. Rep. of Germany | 137/543.15 |
| 1004261 | 11/1951 | France | 188/289 |
| 342061 | 12/1959 | Switzerland | 188/322.13 |
| 428325 | 5/1935 | United Kingdom . | |
| 482989 | 4/1938 | United Kingdom | 137/543.15 |
| 722812 | 2/1955 | United Kingdom | 188/282 |
| 1051263 | 12/1966 | United Kingdom . | |
| 1365306 | 8/1974 | United Kingdom . | |
| 2157402 | 10/1985 | United Kingdom . | |

*Primary Examiner*—George E. A. Halvosa
*Attorney, Agent, or Firm*—Scherlacher, Mok & Roth

[57] ABSTRACT

A telescopic hydraulic damper includes an outer tube filled with working oil, a pipe member mounted on the bottom of the outer tube, and an inner tube slidably disposed in the outer tube. A valve structure disposed in an inner end of the inner tube comprises a valve body lossely fitted over the pipe member, and a plurality of valve seats mounted in the inner end of the inner tube and spaced from each other across the valve body. The valve seats include an oil locking seat for shutting off working oil between the oil locking seat and the valve body upon engagement with each other, and a rebound seat for allowing working oil to flow between the rebound seat and the valve body upon engagement with each other. The oil locking seat having a surface for engaging the valve body, the surface being inclined at an acute angle with respect to the longitudinal axis of the damper.

5 Claims, 6 Drawing Sheets

VALVE STRUCTURE FOR TELESCOPIC HYDRAULIC DAMPER

BACKGROUND OF THE INVENTION

1. Field of the Invention

The present invention relates to a hydraulic damper, and more particularly to a valve structure in a hydraulic damper having telescopically interfitted inner and outer tubes, the valve structure being disposed in the inner end of the inner tube.

2. Description of the Relevant Art

There is known a telescopic hydraulic damper having an outer tube and an inner tube slidably inserted in the outer tube. A pipe member is centrally fixed at one end to the closed bottom of the outer tube which is filled with working oil, and the inner tube has an inner end positioned between the outer tube and the pipe member, with a damper valve being mounted in the inner end of the inner tube. The damper valve includes a valve body fitted over the pipe member and movable between upper and lower valve seats attached to the inner end of the inner tube. One of the valve seats is an oil locking seat which shuts off working oil between itself and the valve body when they engage each other. The other valve seat is a rebound seat which allows working oil to flow between itself and the valve body when they are brought into engagement with each other. Such a valve structure is shown in FIG. 20 of U.S. Pat. No. 4,278,266.

During the tension stroke of the damper, the valve body is held against the oil locking seat to stop the oil flow therebetween, thus producing a large damping force. During the compression stroke of the damper, especially in a high speed range, the valve body is moved off the oil locking seat into contact with the rebound seat, and the working oil flows between the vavle body and the oil locking seat and through a recess defined in the rebound seat. In the compression stroke, the damper produces a small damping force than the damping force generated during the tension stroke.

The oil locking seat has a seat surface lying perpendicularly to the longitudinal axis of the damper. The instant the valve body is unseated off the seat surface of the oil locking seat during an initial stage of the compression stroke, the working oil flow between the valve body and the oil locking seat is caused to change its direction through 90°. Because of the resistance presented to the oil flow by such a sudden directional change, the damping force in the compression stroke has its peak during the initial stage thereof. There has been a demand for eliminating such a peaky damping force.

SUMMARY OF THE INVENTION

According to an aspect of the present invention, there is provided a valve structure in a hydraulic damper including an outer tube filled with working oil, a pipe member mounted on a bottom of the outer tube, an inner tube slidably disposed in the outer tube, the inner tube having an inner end positioned between the outer tube and the pipe member, the valve structure being disposed in the inner end of the inner tube, the valve structure comprising a valve body loosely fitted over the pipe member, and a plurality of valve seats mounted in the inner end of the inner tube and spaced from each other across the valve body, the valve seats including an oil locking seat for shutting off working oil between the oil locking seat and the valve body upon engagement with each other, and a rebound seat for allowing working oil to flow between the rebound seat and the valve body upon engagement with each other, the oil locking seat having a surface for engaging the valve body, the surface being inclined at an acute angle with respect to a longitudinal axis of the damper.

The valve structure provides a smoother working oil flow passage than that of the conventional valve structure. An abrupt peaky increase in the damping force during an initial period of the compression stroke of the damper is reduced for improved damping performance.

According to another aspect of the present invention, the oil locking seat is movable in the radial direction of the damper. This allows the gap between the pipe member and the valve body to be kept constant in the circumferential direction at all times, with the result that the stable damping force can be produced particularly during the tension stroke of the damper.

With the valve body normally urged by a spring toward the inclined surface of the oil locking seat, the valve body is made highly responsive when damper operation changes from the compression stroke to the tension stroke.

According to still another aspect of the present invention, the spring as it is compressed is substantially fully accommodated in the valve body, so that the spring does not obstruct the flow of working oil.

According to yet still another aspect of the present invention, the valve body is held in line-to-line contact with the inclined surface of the valve body for providing high sealing capability during the tension stroke and for permitting the valve body to be quickly separated from the inclined surface of the oil locking seat upon a shift from the tension stroke to the compression stroke.

According to a further aspect of the present invention, the valve body has a surface for engaging the inclined surface of the oil locking seat, the surface lying in a spheripheral plane around the center of tilting movement of the valve body. The valve body remains in contact with the inclined surface of the oil locking seat at all times even when the valve body is tilted during the tension stroke.

According to the still further aspect of the present invention, the spring for normally urging the valve body against the inclined surface of the oil locking seat is of a disc shape having holes for passage of working oil therethrough. The spring with such oil holes does not obstruct the flow of working oil.

According to a yet still further aspect of the present invention, the valve body comprises a resilient body and a metal member attached to the inner peripheral surface of the resilient body and spaced a gap from the outer periphery of the pipe member. Therefore, the valve body does not produce impact sound or noise when it hits the inclined surface of the oil locking seat, and can be held in intimate contact with the inclined surface of the oil locking seat. The gap between the outer periphery of the pipe member and the valve body is kept constant at all times by the metal member.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
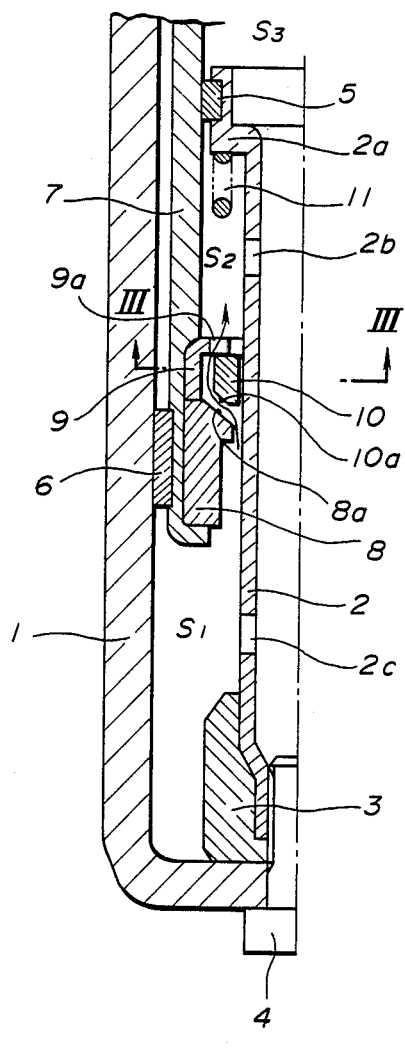
FIG. 1 is a fragmentary longitudinal cross-sectional view of a valve structure according to a first embodiment of the present invention, with one half of the valve structure being omitted from illustration.

FIG. 1 shows a valve structure according to a first embodiment of the present invention. As shown in FIG. 1, a telescopic hydraulic damper includes a bottom case 1 filled with working oil and accommodating therein a seat pipe 2 having its lower end secured to the bottom of the bottom case 1 by a bolt 4 with an oil locking piece 3 retained around the lower end of the seat pipe 2. The seat pipe 2 has a flange 2a on its upper end, and a seal ring 5 is fitted over the outer peripheral surface of the flange 2a. The seat pipe 2 has oil holes or orifices 2b, 2c defined in its upper and lower portions, respectively.

Between the bottom case 1 and the seat pipe 2, there is slidably disposed a fork pipe 7 with a slide bearing 6 fitted over the lower end thereof and held in sliding contact with the inner peripheral surface of the bottom case 1. An oil locking collar 8 and a rebound seat 9 are fitted in the lower end of the fork pipe 7. An annular free valve 10 loosely fitted over the seat pipe 2 is retained movably between the oil locking collar 8 and the rebound seat 9.

A rebound spring 11 is mounted on the lower surface of the flange 2a of the seat pipe 2.

Figure 2:
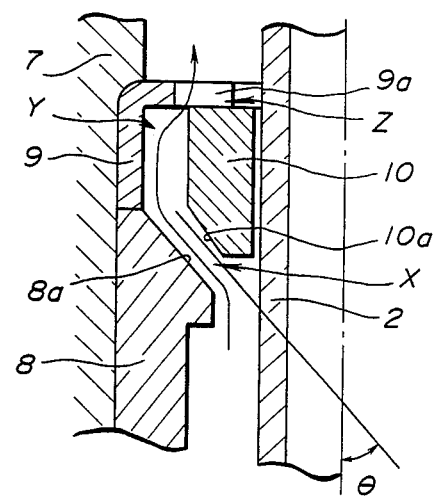
FIG. 2 is an enlarged fragmentary cross-sectional view of the valve structure shown in FIG. 1.
Figure 3:
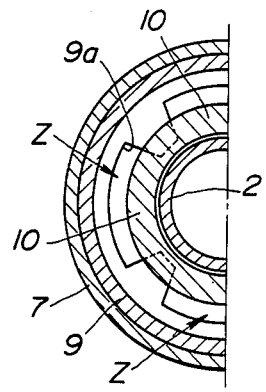
FIG. 3 is a cross-sectional view taken along line III—III of FIG. 1.

As illustrated in FIG. 2, the oil locking collar 8 and the free valve 10 have mutually engageable abutment surfaces 8a, 10a, respectively, which are inclined downwardly at an acute angle $\theta$ with respect to the longitudinal axis of the damper. As shown in FIGS. 2 and 3, the rebound seat 9 has a flow passage defined by circumferentially spaced recesses 9a in its inner edge.

The damper thus constructed operates as follows:

When the fork pipe 7 is lowered in the bottom case 1 during the compression stroke of the damper, working oil in a chamber S1 above the bottom of the bottom case 1 and below the lower end of the fork pipe 7 flows upwardly in the direction of the arrow while lifting the free valve 10, into a chamber S2 above the rebound seat 9 and below the flange 2a of the seat pipe 2. The working oil then flows from the chamber S2 via the orifice 2b into a chamber S3 above the seat pipe 2.

At this time, a damping force is produced by the resistance applied to the working oil flow by a flow passage X between the oil collar 8 and the free valve 10, an annular flow passage Y between the free valve 10 and the rebound seat 9, and the flow passage Z defined by the recesses 9a in the rebound seat 9.

Figure 4:
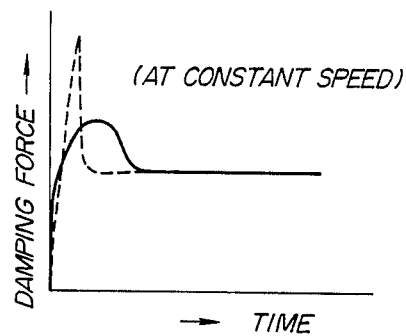
FIG. 4 is a graph showing damping forces.

Since the abutment surfaces 8a, 10a of the oil locking collar 8 and the free valve 10 are inclined downwardly, the flow passage X defined therebetween is also inclined to the longitudinal axis of the damper, and the resistance imposed on the oil flow by the inclined flow passage X is small during an initial stage of the compression stroke of the fork pipe 7. As shown in FIG. 4, the damping force produced by the valve structure of the invention during the compression stroke is less peaky as indicated by the solid line than the damping force, as indicated by the dotted line, generated by the conventional valve structure.

Figure 5:
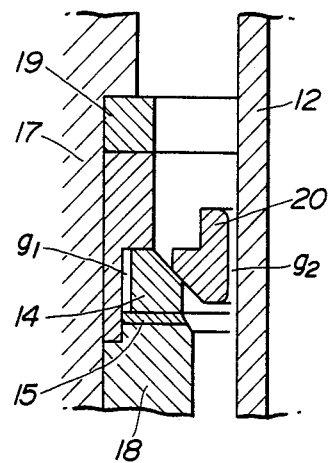
FIG. 5 is a fragmentary longitudinal cross-sectional view of a valve structure according to a second embodiment of the present invention, with one half of the valve structure being omitted from illustration.

FIG. 5 shows a valve structure according to a second embodiment of the present invention. A collar 18 and a rebound seat 19 are fitted in the lower end of a fork pipe 17. An annular valve seat 14 is retained between the collar 18 and the rebound seat 19 with a gap gl left between the annular valve seat 14 and the rebound seat 19 so that the annular valve seat 14 is movable radially of the damper. An annular free valve 20 is disposed around a seat pipe 12 and positioned between the valve seat 14 and the rebound seat 19 with a gap g2 between the free valve 20 and a seat pipe 12. Between the collar 18 and the valve seat 14, there is interposed a thrust washer 15 made of Teflon or the like for facilitating radial movement of the valve seat 14.

In operation, during the tension stroke of the damper, working oil flows downwardly to depress the free valve 20 into intimate contact with the valve seat 14. Since the valve seat 14 is radially movable, the free valve 20 is centered by the seat pipe 12 thereby to uniformize the gap g2 in the circumferential direction between the seat pipe 12 and the free valve 20.

Figure 6:
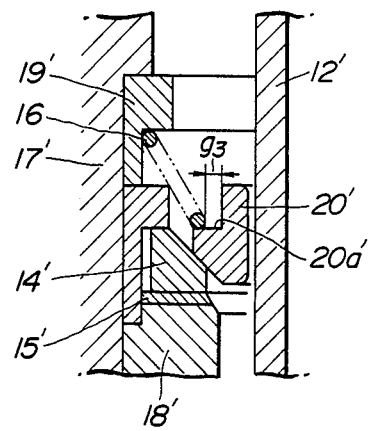
FIG. 6 is a view similar to FIG. 5, showing a modification of the second embodiment.

FIG. 6 shows a modification of the second embodiment of FIG. 5. A free valve 20' is normally urged by a valve spring 16 to move in a direction toward a valve seat 14'. If the lower end (inside diameter portion) of the valve spring 16 were held against a corner 20a' of a step of the free valve 20', the free valve 20' would be centered by the valve spring 16, and would not be automatically centered in response to the tilting of the seat pipe 12'. With the illustrated modification, however, a radial gap g3 is present between the corner 20a' of the step of the free valve 20' and the lower end of the valve spring 16 for enabling the free valve 20' to be automatically centered with respect to the seat pipe 12'.

Figure 7:
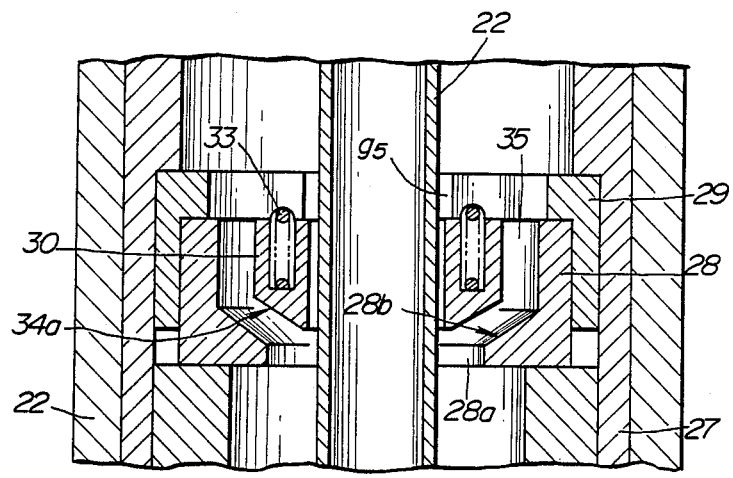
FIG. 7 is a fragmentary longitudinal cross-sectional view of a valve structure according to a third embodiment of the present invention.
Figure 8:
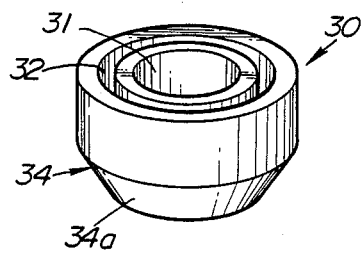
FIG. 8 is a perspective view of a free valve in the valve structure illustrated in FIG. 7.
Figure 9:
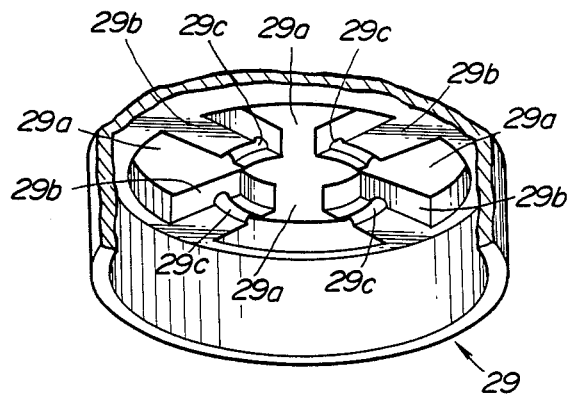
FIG. 9 is a perspective view, partly broken away, of a rebound seat in the valve structure of FIG. 7.

FIGS. 7 through 9 show a valve structure in accordance with the third embodiment of the present invention. As illustrated in FIGS. 7 and 8, a free valve 30 has a central hole 31 through which a seat pipe 22 extends, and an annular or cylindrical groove 32 defined radially outwardly of the central hole 31 in concentric relation thereto. A spring 33 is disposed in the cylindrical groove 32 for normally urging the free valve 30 in a closing direction (i.e., downward direction). The free valve 30 has an inclined surface 34a on the outer periphery of a lower portion 34 thereof.

A rebound seat 29 is fitted in a fork pipe 27 and around the seat pipe 22 with a gap g5 between the rebound seat 29 and the seat pipe 22. As shown in FIG. 9, the rebound seat 29 has on its closed end or bottom a plurality of radial partitions 29b defining a plurality of oil holes 29a therebetween. The partitions 29b have slots 29c, respectively, which receive an end of the spring 33 mounted in the groove 32 of the free valve 30.

An oil locking seat 28 (FIG. 7) is fitted in the rebound seat 29 and has an oil hole 28a defined in its lower end. The oil locking seat 28 also has an inclined surface 28b on the inner periphery of a lower end portion thereof, the inclined surface 28b being radially opposite to the inclined surface 30a of the free valve 30.

Since the free valve 30 is biased by the spring 33 toward the oil locking seat 28, the free valve 30 is highly responsive when the operation of the damper changes from the compression stroke to the tension stroke. During the compression stroke, the compressed spring 33 does not obstruct the flow of working oil as it is almost entirely accommodated in the free valve 30.

Figure 10:
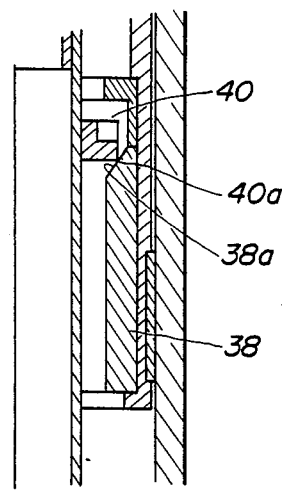
FIGS. 10 and 11 are fragmentary longitudinal cross-sectional views of a valve structure according to a fourth embodiment of the present invention, with one half of the valve structure being omitted from illustration.
Figure 11:
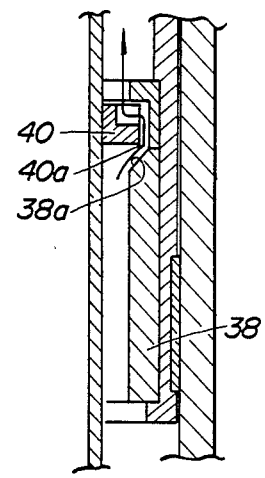

According to a fourth embodiment shown in FIGS. 10 and 11, a free valve 40 has a rounded outer peripheral edge 40a on its lower end for line-to-line contact with an inclined surface 38a of an oil locking collar 38. During the tension stroke, the free valve 40 and the oil locking collar 38 contact each other under high contact pressure to provide an excellent sealing capability therebetween. As damper operation changes from the tension stroke to the compression stroke, the free valve 40 is quickly unseated off the oil locking collar 38, providing a flow passage therebetween. The free valve 40 and the oil locking collar 38 can thus quickly be separated from each other without sticking which would result from face-to-face contact between the free valve and the oil locking collar upon shifting from the tension stroke to the compression stroke.

Figure 12:
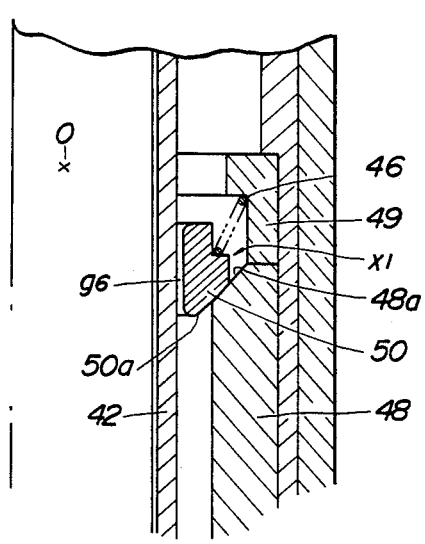
FIG. 12 is a fragmentary longitudinal cross-sectional view of a valve structure according to a fifth embodiment of the present invention, with one half of the valve structure being omitted from illustration.
Figure 13:
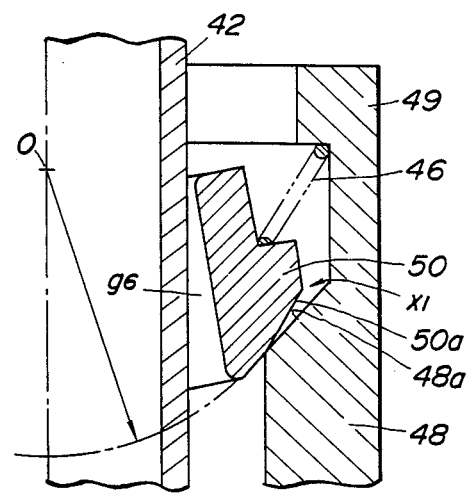
FIG. 13 is an enlarged fragmentary cross-sectional view showing a free valve as it is tilted in the valve structure of FIG. 12.

FIGS. 12 and 13 illustrate a valve structure according to a fifth embodiment of the present invention. A free valve 50 normally biased against on oil locking collar 48 by a spring 46 having one end engaging a rebound seat 49 has a partly spherical outer peripheral surface 50a on its lower end. When the damper is extended, the free valve 50 abuts against an inclined seat surface 48a of the oil locking collar 48. The free valve 50 has its inner peripheral surface spaced by a gap g6 from the outer peripheral surface of a seat pipe 42. The free valve 50 is therefore tiltable with respect to the axis of the seat pipe 42. The partly spherical outer peripheral surface 50a of the free valve 50 is defined to lie in a spherical surface around the center O of tilting movement of the free valve 50. Therefore, even when the free valve 50 is tilted particularly during the tension stroke of the damper, the partly spherical surface 50a of the free valve 50 remains in contact with the inclined seat surface 48a of the oil locking collar 48 inasmuch as the surface 50a is part of the spherical surface around the point O. Accordingly, during the tension stroke, any flow passage X1 is prevented from being defined between the surfaces 48a, 50a and a stable damping force can be generated.

Figure 14:
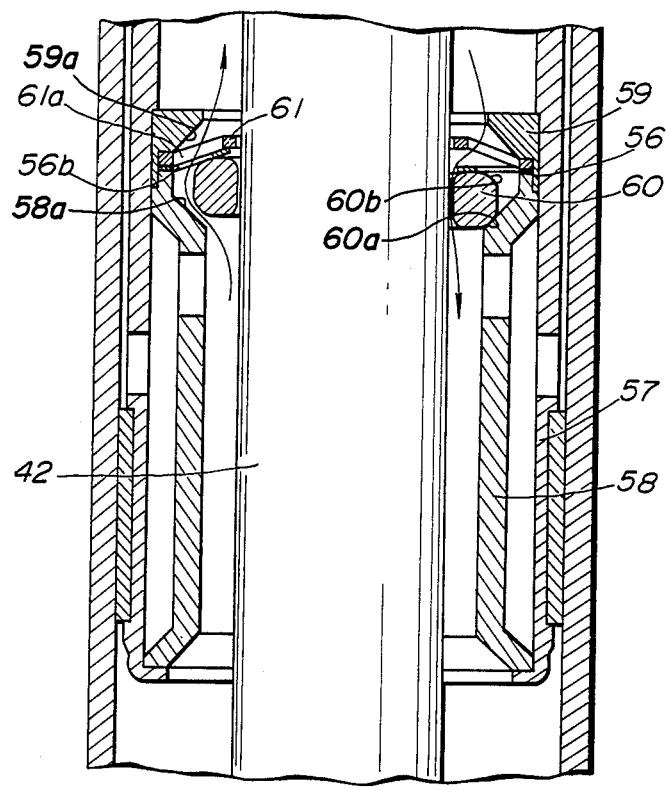
FIG. 14 is a fragmentary longitudinal cross-sectional view of a valve structure according to a sixth embodiment of the present invention.
Figure 15:
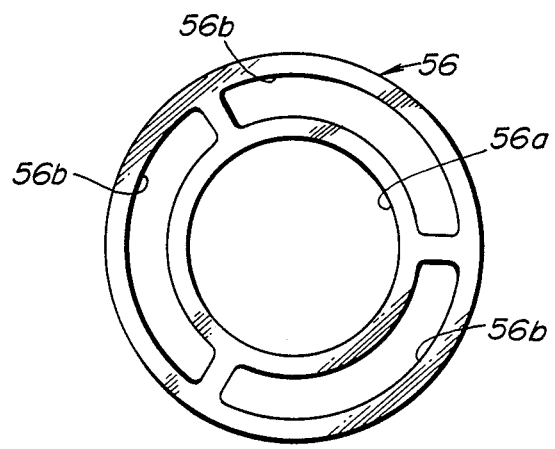
FIG. 15 is a plan view of a disc valve in the valve structure of FIG. 14.

FIGS. 14 and 15 show a valve structure according to a sixth embodiment of the present invention. In this embodiment an oil locking collar 58 has surface 58a and a rebound seat 59 has surface 59a, which are inclined at acute angles with respect to a longitudinal axis of the damper. A free valve 60 has a first spherical portion 60a engageable with the surface 58a and a second spherical portion 60b which faces the surface 59a. A annular disc spring 56 is sandwichd at its outer periphery between the upper end of an oil locking collar 58 and the lower end of a rebound seat 59. An inner peripheral surface of the disc spring 56 is axially movable. The disc spring 56 has a lower surface held in contact with the upper surface of the free valve 60. The disc spring 56 normally urges the free valve 60 in a direction toward the oil locking collar 58. As shown in FIG. 15, the disc spring 56 has a central hole 56a through which a seat pipe 42 extends, and three arcuate holes 56b around the central hole 56a which are arranged in an annular pattern for passage of working oil therethrough. Between the oil locking collar 58 and the rebound seat 59, there is sandwiched an outer periphery of an annular valve stopper 61. An inner part of the valve stopper 61 is positioned upwardly of the valve spring 56 for limiting upward movement of the free valve 60. The valve stopper 61 has holes 61a for allowing working oil to flow therethrough.

During the compression stroke of the hydraulic damper, a fork pipe 57 is lowered, and working oil within an oil chamber below the free valve 60 lifts the free valve 60 against the biasing force of the disc spring 56. The annularly arranged oil holes 56b defined in the disc spring 56 are not closed even when the disc spring 56 is pushed up by the free valve 60, and the working oil flow is not obstructed by the disc spring 56. Conventionally, however, the free valve is urged toward the oil locking collar by a coil spring disposed across the oil passage, and the gaps between the turns of the coil spring are reduced as the coil spring is compressed, thereby obstructing the working oil flow. According to the embodiment shown in FIGS. 14 and 15, furthermore, the damping force can be varied more freely by altering the thickness of the disc spring 56 and the shape of the oil holes 56b.

Figure 16:
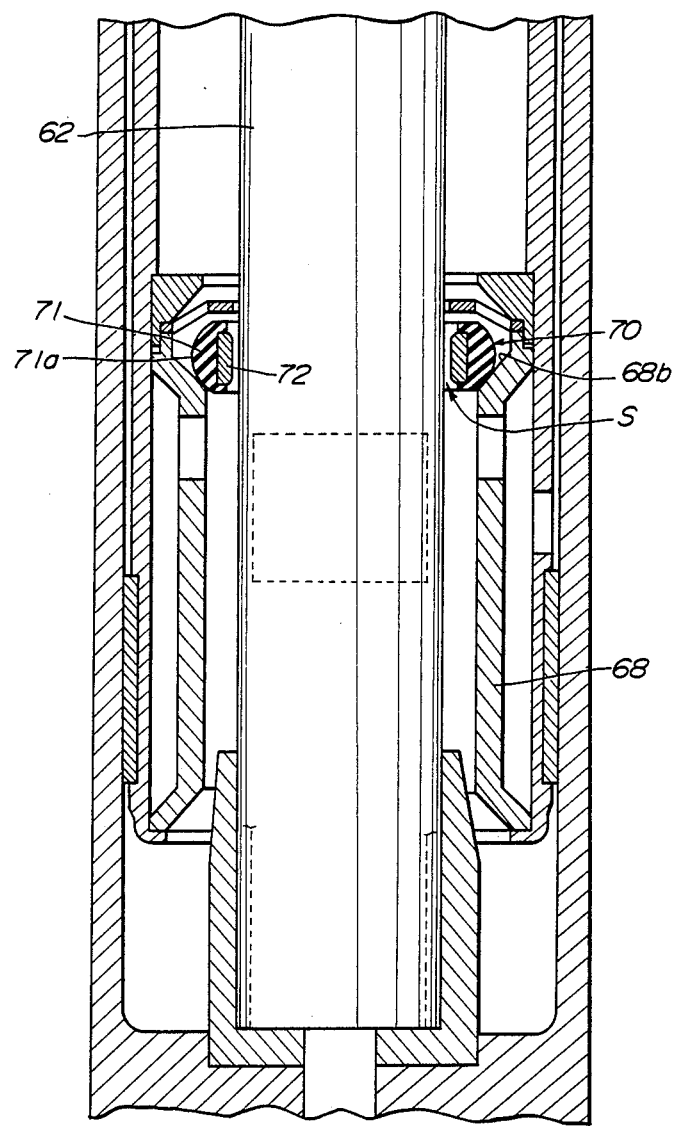
FIG. 16 is a fragmentary longitudinal cross-sectional view of a valve structure according to a seventh embodiment of the present invention.

A free valve 70 according to a seventh embodiment shown in FIG. 16 comprises an annular resilient body 71 made of rubber or the like and an annular metal member 72 attached to the inner peripheral surface of the annular resilient body 71, the resilient body 71 having a partly spherical outer peripheral surface 71a. During the compression stroke, working oil from an oil chamber below the free valve 70 smoothly flows along the partly spherical outer peripheral surface 71a. During the tension stroke, working oil in an oil chamber above the free valve 70 pushes the free valve 70 against an inclined surface 68b of an oil locking collar 68, thus closing the oil passage therebetween. Since the outer body 71 of the free valve 70 is resilient, no impact sound or noise is produced when the free valve 70 hits the inclined surface 68b of the oil locking collar 68. Because the free valve 70 is resiliently held in intimate contact with the inclined surface 68b of the oil locking collar 68, the oil passage is reliably closed. The inner metal member 72 of the free valve 70 serves to keep an annular oil passage S constant at all times between the free valve 70 and a seat pipe 72 extending through the annular free valve 70.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A valve structure in a hydraulic damper of a telescopic front fork for a motorcycle including an outer tube filled with working oil, a pipe member mounted on a bottom of said outer tube, an inner tube slidably disposed in said outer tube, said inner tube having an inner end positioned between said outer tube and said pipe member, said valve structure being disposed in the inner end of said inner tube for controlling the working oil flow during both tension and compression strokes, said valve structure comprising:

an annular valve body having upper and lower sides, the valve body loosely fitted around said pipe member so as to define a gap between the valve body and said pipe member for continuous fluid communication between said upper and lower sides;

a pair of valve seats mounted in the inner end of said inner tube and spaced in the axial direction thereof from each other across said valve body, said valve seats including an oil locking seat for shutting off working oil between the oil locking seat and said valve body upon engagement with each other, and a rebound seat for allowing working oil to flow between the rebound seat and said valve body, said oil locking seat having a surface inclined at an acute angle with respect to a longitudinal axis of the damper, said valve body having a spherical surface for engaging the inclined surface of said oil locking seat; and an annular disc spring for normally urging said valve body toward the inclined surface of said oil locking seat, said disc spring having an outer periphery interposed between said oil locking seat and said rebound seat and an inner periphery movable in the axial direction thereof, and having first aperture means for passage of working oil therethrough.

2. A valve structure according to claim 1, wherein said valve body is formed of a resilient material and has a metal ring disposed on an inner peripheral surface of said valve body.

3. A valve structure according to claim 2, wherein said resilient material is rubber.

4. A valve structure according to claim 1, further including a valve stopper disposed between said valve body and said rebound seat for limiting upward movement of said valve body, said valve stopper having second aperture means for passage of working oil therethrough.

5. A valve structure according to claim 4, wherein said valve stopper has an outer periphery thereof interposed between said oil locking seat and said rebound seat.

* * * * *